(12) United States Patent
Flury et al.

(10) Patent No.: US 12,160,480 B2
(45) Date of Patent: Dec. 3, 2024

(54) METHOD FOR MANAGING A GROUP OF DEVICES, ASSOCIATED SERVER AND SYSTEM

(71) Applicant: Orange, Paris (FR)

(72) Inventors: Thibaud Flury, Châtillon (FR); Jean-Didier Ott, Châtillon (FR); Samuel Berlemont, Châtillon (FR)

(73) Assignee: ORANGE, Issy-les-Moulineaux (FR)

(*) Notice: Subject to any disclaimer, the term of this patent is extended or adjusted under 35 U.S.C. 154(b) by 0 days.

(21) Appl. No.: 17/041,253

(22) PCT Filed: Mar. 26, 2019

(86) PCT No.: PCT/FR2019/050681
§ 371 (c)(1),
(2) Date: Sep. 24, 2020

(87) PCT Pub. No.: WO2019/186049
PCT Pub. Date: Oct. 3, 2019

(65) Prior Publication Data
US 2021/0014332 A1    Jan. 14, 2021

(30) Foreign Application Priority Data
Mar. 29, 2018 (FR) ........................ 1852754

(51) Int. Cl.
*H04L 67/00* (2022.01)
*H04L 41/0893* (2022.01)

(52) U.S. Cl.
CPC .......... *H04L 67/34* (2013.01); *H04L 41/0893* (2013.01)

(58) Field of Classification Search
None
See application file for complete search history.

(56) References Cited

U.S. PATENT DOCUMENTS

| | | | |
|---|---|---|---|
| 7,921,200 B2 * | 4/2011 | Dieberger | H04L 43/00 709/224 |
| 8,095,120 B1 * | 1/2012 | Blair | H04M 3/562 455/518 |

(Continued)

OTHER PUBLICATIONS

International Search Report and Written Opinion dated May 23, 2019 for Application No. PCT/FR2019/050681.

(Continued)

*Primary Examiner* — Ario Etienne
*Assistant Examiner* — Mohammad Yousuf A. Mian
(74) *Attorney, Agent, or Firm* — Knobbe, Martens, Olson & Bear, LLP

(57) ABSTRACT

A method is provided for managing a group of equipment, as well as an associated server and system. The method may be implemented by a main referring server, and includes defining a subgroup of equipment from the group of equipment, the subgroup of equipment comprising at least two pieces of equipment from group of equipment, having the same value for at least one common configuration parameter. The method also includes determining a piece of equipment delegated to implement at least one portion of a maintenance operation on at least one piece of equipment of the sub-group of equipment, where the delegated piece of equipment is another piece of equipment from the sub-group of equipment.

7 Claims, 3 Drawing Sheets

(56) References Cited

U.S. PATENT DOCUMENTS

| | | | |
|---|---|---|---|
| 10,499,221 B2* | 12/2019 | Guo | H04W 24/10 |
| 2002/0114286 A1* | 8/2002 | Iwamura | H04L 12/1868 370/252 |
| 2017/0228184 A1* | 8/2017 | Kuznetsov | G06F 3/067 |
| 2017/0310742 A1* | 10/2017 | Jain | H04L 67/34 |
| 2018/0035419 A1* | 2/2018 | Beattie, Jr. | H04W 72/085 |
| 2018/0227214 A1* | 8/2018 | Huang | H04L 67/10 |
| 2018/0331891 A1* | 11/2018 | Zhao | H04L 67/34 |

OTHER PUBLICATIONS

Robles, et al.. "Device group management in constrained networks" 2016 IEEE International Conference on Pervasive Computing and Communication Workshops (PERCOM Workshops), IEEE, Mar. 14, 2016 (Mar. 14, 2016), pp. 1-6 DOI: 10.1109/PERCOMW.2016.7457128.

Chen, et al. "Efficient device group management in oneM2M" 2018 IEEE 4TH World Forum on Internet of Things (WF-IoT), IEEE, Feb. 5, 2018 (Feb. 5, 2018), pp. 439-444 DOI: 10.1109/WF-IOT.2018.8355131 XP033338369.

Farhadi, et al. "Group-Based Signaling and Access Control for Cellular Machine-to-Machine Communication" 2013 IEEE 78th Vehicular Technology Conference (VTC Fall), IEEE, Sep. 2, 2013 (Sep. 2, 2013), pp. 1-6, [retrieved on dec. 22, 2013] DOI: 10.1109/VTCFALL.2013.6692218.

Trentin, et al. "Lightweight M2M protocol: Archetyping an IoT device, and deploying an upgrade architecture" 2018 IEEE International Conference on Pervasive Computing and Communications Workshops (PERCOM Workshops), IEEE, Mar. 19, 2018 (Mar. 19, 2018), pp. 403-408 doi: 10.1109/PERCOMW.2018.8480313 XP033413429.

Stusek, et al. "Remote management of intelligent devices: Using TR-069 protocol in IoT" 2016 39th International Conference on Telecommunications and Signal Processing (TSP), IEEE, Jun. 27, 2016 (Jun. 27, 2016), pp. 74-78 DOI: 10.1109/TSP.2016.7760832 XP033014681.

* cited by examiner

METHOD FOR MANAGING A GROUP OF DEVICES, ASSOCIATED SERVER AND SYSTEM

RELATED APPLICATIONS

This application is the U.S. National Phase of Application No. PCT/FR2019/050681 entitled "METHOD FOR MANAGING A GROUP OF DEVICES, ASSOCIATED SERVER AND SYSTEM" and filed Mar. 26, 2019, which claims the benefit of French Patent Application No. 1852754, filed Mar. 29, 2018, each of which is incorporated by reference in its entirety.

BACKGROUND OF THE INVENTION

The present invention relates to the general field of the management of computer devices, and relates more particularly to a method for managing a group of devices.

Known device management techniques, allow in particular performing remote maintenance operations on massively distributed devices, such as television decoders or routers.

These automated maintenance operations (for example the update of an embedded software or firmware) are defined in standardized device management protocols, such as the TR-069 protocol, defined by the technical report prepared by the Broadband Forum, entitled "CPE WAN Management Protocol"; OMA-DM for "OMA-Device Management" defined by the OMA (for "Open Mobile Alliance") organization or OMA-LwM2M (for "Lightweight Machine to Machine") also defined by the OMA.

According to some known techniques, a referent server manages the operations of maintaining a fleet of devices of the same category. Each device of this category can send a message to the referent server so that the referent server determines whether a maintenance operation needs to be performed for this device, then initiates the maintenance operation if the latter needs to be performed.

However, when the fleet of devices of the same type is large, the server must be dimensioned accordingly in order to be able to manage the entire fleet, which generates significant financial costs.

OBJECT AND SUMMARY OF THE INVENTION

The present invention relates to a method for managing a group of devices, said method comprising the following steps, implemented by a main referent server:
  definition of a sub-group of devices from said group of devices, said sub-group of devices comprising at least two devices from said group of devices, having the same value for at least one common configuration parameter,
  determination of a delegate device for the implementation of at least part of a maintenance operation on at least one device from said sub-group of devices,
  wherein said delegate device is a device from said sub-group of devices.

The determination of a delegate device for the implementation of at least part of a maintenance operation on at least one device from the sub-group of devices allows unloading the main referent server for this maintenance operation, which brings a significant gain in terms of performance.

More specifically, since each delegate device has to manage the implementation of at least part of a maintenance operation on devices from a sub-group comprising a reduced number of devices, the duration of the maintenance operation is reduced. Indeed, the main referent server then processes fewer devices. The command relating to the operation is therefore broadcasted more quickly, thereby decreasing the overall duration of the operation. The capacity of the main referent server can be reduced, and the costs associated with the maintenance operation are therefore reduced.

The invention is particularly interesting when the maintenance operation is a critical operation, for example a preventive or curative operation linked to a security crisis.

No limitation is attached to the number of sub-groups created for a plurality of devices from said group of devices, having the same value for at least one common configuration parameter. It is possible to create several sub-groups, in order to limit the size of the sub-group. This allows improving the efficiency of the proposed method.

In a particular embodiment, the devices from the sub-group of devices have at least one common characteristic, said at least one characteristic being typically a regularity of frequency of connection to the main referent server of the device, or a geographical area within which the device is positioned.

Taking into account such a characteristic allows optimizing the response times and minimizing the communication latency between a client device and a delegate device, while ensuring integrity of the sub-group of devices over the estimated service life period of the sub-group of devices. The devices that often change configuration, and that are therefore likely to be excluded from the sub-group, and thus to be managed by the main referent server, are therefore not added to the sub-group.

In a particular embodiment, the step of determining the delegate device is performed on the basis of a delegation criterion associated with said delegate device. The delegation criterion is for example a service quality criterion.

The service quality criterion allows selecting a delegate device having the capacities to ensure the management of the maintenance operation for each device from its sub-group of devices, and thus to ensure efficient management of the maintenance operation.

In a particular embodiment, the method further comprises a step of sending, by the main referent server to said delegate device, a message comprising an instruction to transfer, to at least one device from said sub-group of devices distinct from said delegate device, at least one command relating to said maintenance operation.

In a particular embodiment, the method further comprises a step of sending, by the main referent server, to at least one device from said sub-group of devices distinct from said delegate device, called client device, a message comprising an instruction to contact the delegate device instead of the main referent server in order to implement said maintenance operation.

In a particular embodiment, said message comprising an instruction to contact the delegate device, sent to said at least one client device, further comprises at least one condition of exclusion from said sub-group of devices.

In a particular embodiment, said at least one exclusion condition is a condition among the following list of exclusion conditions:
  a maximum duration of allocation of said client device to said sub-group of devices,
  a maximum number of permitted operations performed by said client device,
  a maximum number of attempts by said client device to contact said delegate device,
  a failure in a procedure of authentication between said client device and said delegate device, a detection of a fraud or a detection of a network vulnerability at said delegate device, a modification of a parameter of configuration of said client device, a detection of instructions concerning a non-permitted operation, a detection of an operation of the client device preventing the client device from contacting the delegate device.

In a particular embodiment, the method further comprises the following steps, implemented by said at least one device from the sub-group of devices:

a step of verifying said at least one condition of exclusion for a client device from said sub-group of devices, and if said at least one exclusion condition is satisfied, a step of excluding said client device from said sub-group of devices.

The exclusion of a client device from the sub-group of devices, on the basis of the verification of the exclusion condition, allows ensuring the proper functioning and the integrity in the medium or long term of the solution of the invention, because it allows taking away a client device from the sub-group of devices, for which the maintenance operation can no longer be managed by the delegate device, due to an obsolescence at the client device and/or to a technical problem at the client device and/or at the main referent server.

In a particular embodiment, the method further comprises a step of dissolving said sub-group of devices when at least one dissolution condition is satisfied.

In a particular embodiment, said at least one dissolution condition is a condition among the following list of dissolution conditions:

a modification of a parameter of configuration of said delegate device, a number of devices from said sub-group below a predetermined threshold.

The dissolution of the sub-group of devices is useful when the delegate device is no longer able to manage the implementation of the maintenance operation on the devices from its sub-group, or when the number of devices from the sub-group is too small for the management of the implementation of the maintenance operation by the delegate device to be efficient.

The proper functioning as well as the medium or long term integrity of the proposed solution are thus ensured, because the delegate device does not then attempt to manage this maintenance operation.

In a particular embodiment, the method further comprises a step of determining the maximum number of devices that said sub-group of devices can comprise, based on at least one delegation criterion associated with said delegate device.

The determination of the number of devices from the sub-group of devices based on a criterion of delegation of the delegate device (typically based on the quality of service) allows preserving part of the resources of the delegate device so that it can carry out its usual tasks without this being restrictive for the user of the delegate device.

The invention further relates to a server able to manage a group of devices, comprising:

a module for defining a sub-group of devices from said group of devices, said sub-group of devices comprising at least two devices from said group of devices, having the same value for at least one common configuration parameter, a module for determining a delegate device for the implementation of at least part of a maintenance operation on at least one device from said sub-group of devices, wherein said delegate device is a device from said sub-group of devices.

The invention further relates to a system able to implement a method as described above. This system comprises a server as described above.

In a particular embodiment, the various steps of the management method are determined by computer program instructions.

Consequently, the invention also relates to a computer program, on an information medium, this program including instructions adapted to the implementation of the steps of a method according to the invention.

This program can use any programming language, and be in the form of source code, object code, or intermediate code between source code and object code, such as in a partially compiled form, or in any other desirable form.

The invention also relates to a computer-readable information medium, and including instructions of a computer program as mentioned above.

The information medium can be any entity or device capable of storing the program. For example, the medium may include a storage means, such as a ROM, for example a CD ROM or a microelectronic circuit ROM, or a magnetic recording means, for example a hard disk.

On the other hand, the information medium can be a transmissible medium such as an electrical or optical signal, which can be conveyed via an electrical or optical cable, by radio or by other means. The program according to the invention can be particularly downloaded from an Internet-type network.

Alternatively, the information medium can be an integrated circuit in which the program is incorporated, the circuit being adapted to execute or to be used in the execution of the method in question.

BRIEF DESCRIPTION OF THE DRAWINGS

Other characteristics and advantages of the present invention will emerge from the description given below, with reference to the appended drawings which illustrate an exemplary embodiment thereof without any limitation. In the figures.

DETAILED DESCRIPTION OF SEVERAL EMBODIMENTS

Figure 1:
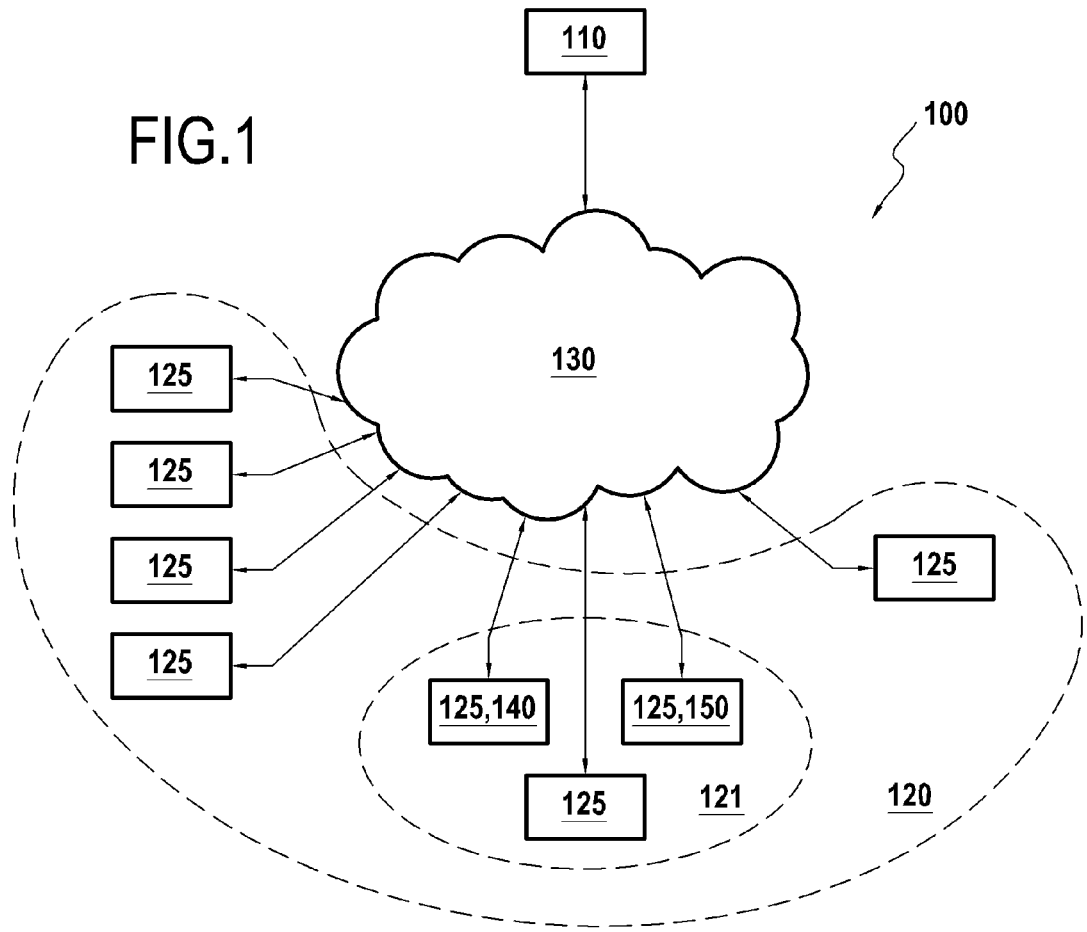
FIG. 1 schematically represents a system for managing a group of devices according to an exemplary embodiment of the invention.

FIG. 1 schematically represents a system 100 for managing a group of devices, able to implement a method for managing a group of devices, according to an exemplary embodiment of the invention.

The system 100 comprises a server 110, called main referent server 110. The main referent server 110 is able to manage a group 120 of devices comprising a plurality of devices 125, which are for example of the same category.

Thus, the devices from the group 120 of devices can be in the category of the network termination devices ("Internet box"), television decoders, routers, Wi-Fi extenders, or photocopiers, etc.

The main referent server 110 can communicate with each device 125 from the group 120 of devices by means of a telecommunications network 130, for example an Internet network, a Wi-Fi network, a Bluetooth network, an NFC network, or a fixed or mobile telephone network (of the type 3G, 4G, etc.).

The system 100 may further comprise a first device 140, as well as optionally a second device 150 from the group 120 of devices.

As described in more detail below with reference to FIG. 3, the first device 140 and the second device 150 are two devices 125 from the group 120 of devices whose at least one common configuration parameter takes the same value. The first device 140 and/or the second device 150 are able to communicate with each device 125 from the group 120 of devices, by means of the telecommunications network 130.

The system 100 may further comprise one or several additional device(s) 125 from the group 120 of devices.

Figure 2:
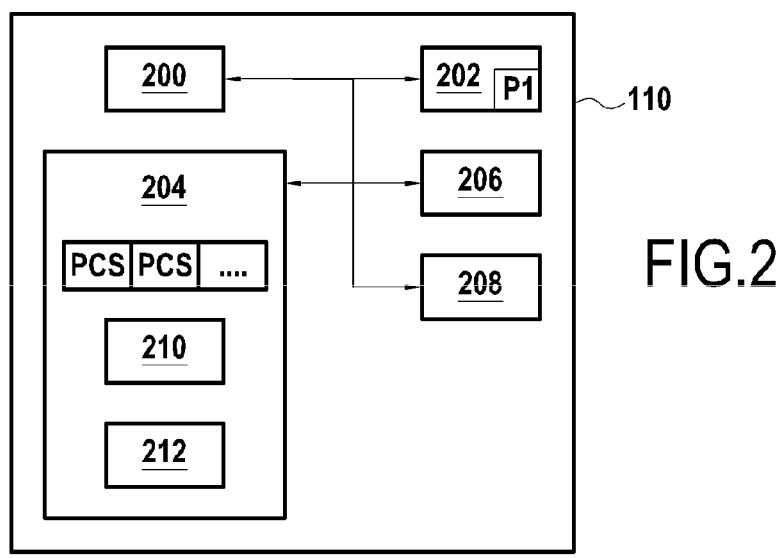
FIG. 2 schematically represents a main referent server of the system of FIG. 1.

As shown in FIG. 2, the main referent server 110 has the conventional architecture of a computer. The main referent server 110 includes in particular a processor 200, a read-only memory 202 (of the "ROM" type), a rewritable non-volatile memory 204 (of the "EEPROM" or "Flash NAND" type for example), a rewritable volatile memory 206 (of the "RAM" type), and a communication interface 208.

The read-only memory 202 of the main referent server 110 constitutes a recording medium in accordance with an exemplary embodiment of the invention, readable by the processor 200 and on which a computer program P1 in accordance with an exemplary embodiment of the invention is recorded. As a variant, the computer program P1 is stored in the rewritable non-volatile memory 204.

The computer program P1 may allow the main referent server 110 to implement the management method in accordance with an exemplary embodiment of the invention, or at least part of this method.

This computer program P1 can thus define functional and software modules, configured to implement the steps of a management method in accordance with an exemplary embodiment of the invention, or at least part of these steps. These functional modules rely on or control the hardware elements 200, 202, 204, 206 and 208 of the main referent server 110 mentioned above. They can comprise here in particular a definition module and a determination module.

The rewritable non-volatile memory 204 can store one or several parameter(s) PCS of configuration of each device 125, 140, 150 from the group 120 of devices, the value of each parameter PCS indicating for example whether a service is subscribed or not by the user of the device 125, 140, 150 or whether an option is subscribed or not by the user of the device 125, 140, 150 (television, voice over IP, etc.). The set of the parameters concerning a device from the group 120 of devices is called the IS (Information System) configuration of the device 125, 140, 150.

In addition, the rewritable non-volatile memory 204 can store a data structure 210, as well as optionally a counter 212 whose roles will be described below with reference to FIG. 3.

In addition, the first device 140, the second device 150 and/or each additional device 125 may also have the conventional architecture of a computer, and may each then include in particular a processor, a read-only memory (of the "ROM" type), a rewritable non-volatile memory (of the "EEPROM" or "Flash NAND" type for example), a rewritable volatile memory (of the "RAM" type), and a communication interface.

Each read-only memory can constitute a recording medium in accordance with an exemplary embodiment of the invention, readable by the associated processor and on which a computer program in accordance with an exemplary embodiment of the invention is recorded. As a variant, the computer program is stored in the associated rewritable non-volatile memory. The computer program may allow the implementation of at least part of the management method in accordance with an exemplary embodiment of the invention.

The rewritable non-volatile memory of each device 125, 140, 150 can store one or several parameter(s) PCL of configuration of the device 125, 140, 150, the value of each parameter PCL being for example able to indicate the category of the device 125, 140, 150, the hardware version of the device 125, 140, 150, the software version of the device 125, 140, 150, or other properties configured or observed locally on the device 125, 140, 150. The set of the parameters concerning this device 125, 140, 150 is called the local configuration of the device 125, 140, 150.

Figure 3:
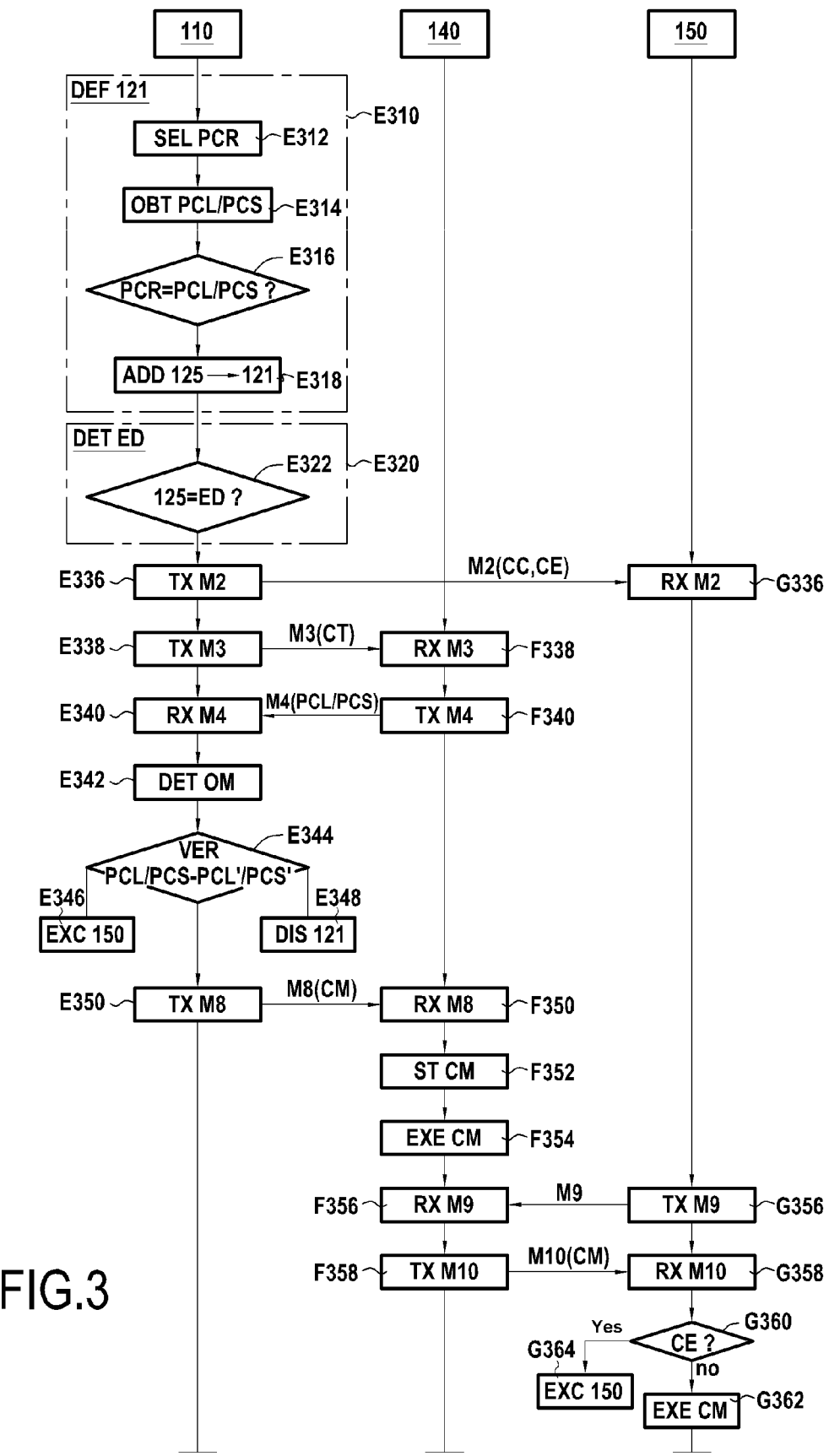
FIG. 3 represents, in the form of a flowchart, the main steps of a method for managing a group of devices according to an exemplary embodiment of the invention.

FIG. 3 represents a method for managing a group of devices, according to an exemplary embodiment of the invention.

The method is implemented by a system for managing a group of devices, for example the system 100 described with reference to FIG. 1. The group managed by the system 100 is then the group 120 of devices, also described with reference to FIG. 1.

The method comprises a step E310, implemented by the definition module of the main referent server 110, for defining a sub-group 121 of devices from the group 120 of devices, comprising at least two devices 125, 140, 150 from the group 120 of devices having the same value for at least one common configuration parameter, as well as possibly a common characteristic.

The definition step E310 can comprise a sub-step E312 of selecting one or several parameter(s) PCR of reference configuration. One or several reference characteristic(s) can also be selected.

Each selected parameter PCR can be a configuration parameter PCL of local configuration or a parameter PCS of IS configuration.

The selection sub-step E312 can further comprise, for each selected parameter PCR, a selection of a reference value of the parameter PCR.

The parameter PCR value(s) is/are selected so as to form a condition for triggering a maintenance operation, for example a necessary and sufficient condition for triggering the maintenance operation. The selection relates to one or several value(s) likely to be shared by several devices 125 from the group 120 of devices.

The maintenance operation is, for example, the update of embedded software (firmware), at least one value indicating the version of the embedded software requiring the maintenance operation.

The main referent server 110 determines for example that the set of parameters PCR comprises a parameter PCL whose value indicates a software version number of the first device 140, and a parameter PCS whose value indicates the subscription to a service by the user of the first device 140, and that this set forms a necessary and sufficient condition for triggering a maintenance operation. The main referent server 110 then selects in this example two parameters PCR of reference configuration.

In addition, each optionally selected reference characteristic can be a regularity of frequency of connection to the main referent server 110 of the device, or a geographical area in which the device is positioned.

The definition step E310 can comprise a sub-step of obtaining E314 the parameters PCL, PCS of configuration of a plurality of devices 125, 140, 150 from the group of devices 120 (for example all the devices), corresponding to the parameter(s) PCR selected in the sub-step E312. The characteristics of these devices corresponding to the selected characteristic(s) can also be obtained. For each of said devices from said plurality of devices, one or several configuration parameter(s) PCL, PCS is/are thus obtained, as well as possibly one or several characteristic(s). It is considered below that said plurality of devices comprises the first device 140 and the second device 150.

At least part of the parameters PCL, PCS and/or of the possible characteristics (typically the parameters PCS of the IS configuration) are for example pre-recorded in the rewritable non-volatile memory 204 of the main referent server 110, and/or in a dedicated database, and are then obtained from this memory or this database.

The main referent server 110 can, for each device 125, 140, 150 of said plurality of devices, record in the data structure 210 and in association with the identifier of the device, one or several parameter(s) PCS of the IS configuration of the device.

In addition, each device 125, 140, 150 of said plurality of devices can send at least part of the parameters and/or of the possible characteristics to the main referent server 110. A device from the group 120 of devices can typically send one or several parameter(s) and/or characteristic(s) in a first message M1, for example sent periodically and/or during a predetermined event, such as the powering of the first device 140, and/or the end of an update operation.

The first message M1 typically comprises at least one configuration parameter PCL of the local configuration of the device 125 sending the first message. The first message M1 is a message generally sent so that the main referent server 110 determines whether a maintenance operation must be implemented on the device 125, 140, 150. If the first message M1 does not comprise an expected parameter, the main referent server 110 can send a request to the device 125 so that the latter sends the parameter.

The main referent server 110 can then record, in the data structure 210, the received configuration parameter(s) PCL, in association with an identifier of the associated device 125, 140, 150, that is to say the device having sent the first message M1 comprising the parameter(s) PCL.

The sub-step E314 can be implemented, for one or several device(s) of the plurality of devices from the group 120 of devices, before the sub-step E312, or after the implementation of the sub-step E312.

When the sub-step E314 is implemented before the sub-step E312, the parameters PCR of reference configuration and/or the reference characteristics are then selected from among the parameters PCL, PCS and/or characteristics obtained in the sub-step E314.

When the sub-step E314 is implemented after the sub-step E312, the parameters PCL, PCS and/or characteristics obtained in the sub-step E314 are obtained based on the parameters PCR and/or reference characteristics selected in the sub-step E312.

The sub-step E314 can for example be implemented a first time for one device of the plurality of devices, before the implementation of sub-step E312. This device is then added to the sub-group 121 of devices, without the comparison sub-step E316, described below, being implemented. After the implementation of the sub-step E312, the sub-step E314 can be implemented for one or several other device(s) of the plurality of devices.

Step E310 can further comprise a sub-step of comparing E316 the values of the obtained configuration parameters PCL, PCS with the reference values of the corresponding reference parameters PCR, and of the possible obtained characteristics with the possible corresponding reference characteristics.

If, for each reference parameter, the value of the corresponding parameter PCL, PCS of a device 125, 140, 150 from the group 120 of devices corresponds to the reference value of the reference parameter PCR, and possibly if for each reference characteristic, the corresponding characteristic of the device 125, 140, 150 is found, the sub-group 121 can comprise the device 125, 140, 150. The device 125, 140, 150 can then be added to the sub-group 121 of devices (sub-step E318).

The defined sub-group 121 can comprise a limited number of devices 125, 140, 150. The number of devices added to the sub-group 121 can be counted by the main referent server 110 by means of the counter 212. The main referent server 110 can for example increment by one the counter 212 each time a device 125, 140, 150 is added to the sub-group 121, and stop adding devices when the value of the counter 212 is equal to a counter threshold value VS. The threshold value VS is typically a value between 10 and 20.

A time condition can also be added, the sub-group 121 being considered complete if the value of the counter 212 is greater than the counter threshold value VS before the end of a predetermined duration.

The sub-group 121 of devices defined in step E310 thus comprises at least two devices 125, 140, 150 having the same value for at least one common parameter and one possible same characteristic, the common parameter being the reference parameter selected in the sub-step E312 and the possible characteristic is the possible characteristic selected in the sub-step E312.

Figure 4:
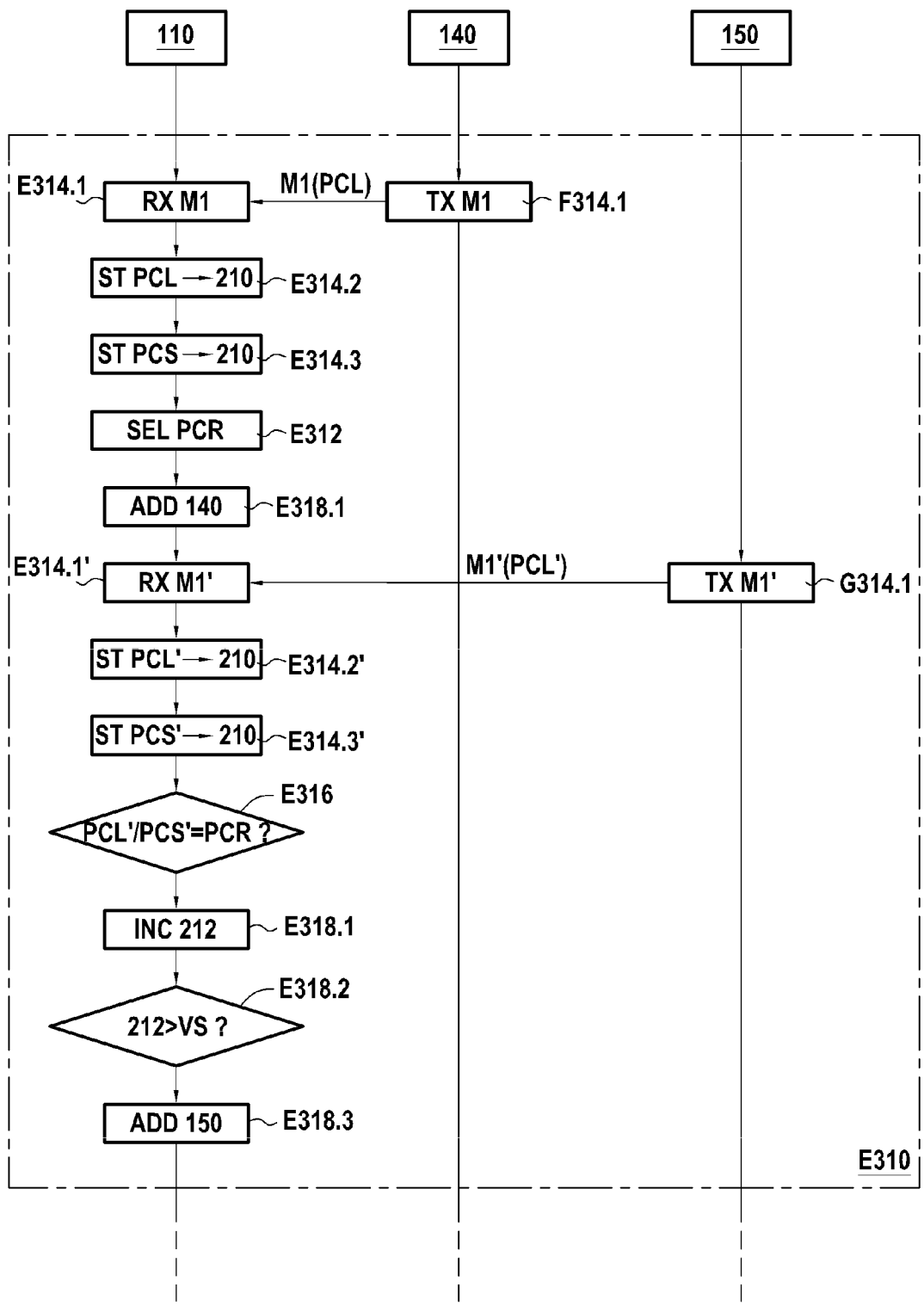
FIG. 4 represents, in the form of a flowchart, the main sub-steps of a step of defining a sub-group of devices, of a method for managing a group of devices according to an exemplary embodiment of the invention.

FIG. 4 illustrates an example of implementation of the definition step E310, in which the constitution of the sub-group 121 is gradual. In this example, the sub-step E314 of obtaining the definition step E310 can comprise a receipt E314.1, by the main referent server 110, of a first message M1 sent by the first device 140. The first device 140 sends (step F314.1) for example this first message M1 periodically and/or during a predetermined event, such as the powering of the first device 140, and/or the end of an update operation.

The first message M1 comprises at least one configuration parameter PCL of the local configuration of the first device 140. The first message M1 is a message generally sent so that the main referent server 110 determines whether a maintenance operation must be implemented on the device 125, 140, 150.

The main referent server 110 can then record (E314.2), in the data structure 210, the received configuration parameter(s) PCL, in association with an identifier of the first device 140.

The sub-step E314.2 as well as the following sub-steps may not be implemented when an update of the first device 140 must be performed, because the configuration of the first device 140 may then change.

In a sub-step E314.3, the main referent server 110 can record, in the data structure 210 and in association with the identifier of the first device 140, one or several parameter(s) PCS of the IS configuration of the first device 140.

The main referent server 110 then selects at least one reference parameter PCR from among the parameter(s) PCL and/or PCS of the first device 140 (sub-step E312).

Each reference configuration parameter PCR selected in the sub-step E312 can be a parameter PCL of the local configuration or a parameter PCS of the IS configuration recorded in the data structure 210. The reference values of the reference parameters are then selected.

The first device 140 is added (sub-step 318.1) to the sub-group 121 of devices.

The sub-steps E314.1 and F314.2 are repeated for the second device 150 (sub-steps E314.1' and G314.1). The second device 150 then sends a first message M1' comprising at least one parameter Pa' of the local configuration of the second device 150. The sub-steps E314.2 and/or E314.3 can then also be repeated for the second device 150 (sub-steps E314.2' and E314.3').

The main referent server 110 thus obtains the configuration parameter(s) Pa' and/or PCS' of the second device 150 corresponding to the reference configuration parameter(s) PCR, and compares their values with the reference values (sub-step E316).

If, for each reference parameter PCR selected in the sub-step E312, the value of the corresponding parameter Pa', PCS' of the second device 150 is the same as the reference value of the reference parameter PCR, the main referent server 110 can increment by one the value of counter 212 in a sub-step E318.1, then compare the value of the counter 212 with a counter threshold value VS (sub-step E318.2).

If the value of the counter 212 is less than or equal to the counter threshold value VS, the main referent server then adds the second device 150 to the sub-group 121 comprising the first device 150 (sub-step E318.3).

The sub-steps E314.1', G314.1, E314.2', E314.3', E316, E318.1 and/or E318.2 may not be implemented when an update of the second device 150 must be performed, because the configuration of the second device 150 can then change.

The sub-steps E314.1', G314.1, E314.2', E314.3', E316, E318.1 and/or E318.2 of step E310 can be repeated for one or several other device(s) 125 from the group 120 of devices.

When, in sub-step E318.2, the value of the counter 212 is greater than the counter threshold value VS (i.e. the main referent server 110 has detected a predetermined number of devices having the same value for at least one common parameter greater than the threshold value VS), the sub-group 121 of devices is complete.

In the remainder of the description, it is considered that the sub-group 121 of devices comprises at least the first device 140 and the second device 150.

In a step E320, the module for determining the main referent server 110 determines a delegate device ED for the implementation of at least part of the maintenance operation, on at least one device 125, 150 from said sub-group 121 of devices.

Step E320 is for example implemented after step E310 of defining the sub-group 121 of devices. The delegate device ED is then determined from among the devices 125, 140, 150 of the sub-group 121 of devices.

As a variant, step E320 is implemented before step E310 of defining the sub-group 121 of devices. The reference parameter(s) PCR selected in sub-step E312 are then parameters PCL, PCS of the delegate device ED.

The delegate device ED is thus designated to initiate, when necessary, the maintenance operation, associated with the reference parameters PCR, on one or several other devices 125, 150 from the sub-group 121 of devices, for example all the other devices 125, 150.

The determination of the delegate device ED is made on the basis of at least one delegation criterion associated with the delegate device ED. A delegation criterion is for example a service quality criterion of said delegate device ED.

The service quality criterion comprises one or several threshold value(s) of technical service quality properties, such as the bandwidth, the latency, the uninterrupted activity time, etc.

A delegation criterion may further be an approval by the user of the device to choose said device as a delegate device ED.

The user can for example subscribe to an offer and in return agree to make available a predefined part of the capabilities of his device to initiate maintenance operations on other devices.

When step E310 is implemented before step E320, the main referent server 110 determines, in a sub-step E322, for a device from the sub-group 121 of devices (for example the first device 140), if this device meets the delegation criterion.

For example, when the delegation criterion is a service quality criterion, the main referent server 110 obtains one or several technical property/properties of the service quality offered by the considered device, for example by measuring them. Then, the main referent server 110 compares obtained the value(s) with the corresponding threshold value(s). The considered device meets the service quality criterion if the value(s) obtained are greater than or equal to the corresponding threshold value(s).

The sub-step E322 is implemented for at least one device 125, 140, 150 from the sub-group 121, for example the first device 140 or the second device 150. Step E334 can be repeated for one or several other device(s), for example all the devices from the sub-group 121.

The result of the first implementation of sub-step E322 as well as possibly the result of one or several other implementation(s) of sub-step E322, are used in order to determine the delegate device ED. Indeed, if a device 125, 140, 150 fulfills the delegation criterion, it is eligible to become a delegate device ED. When several devices 125, 140, 150 are eligible to become a delegate device, the delegate device is for example chosen at random from among these devices 125, 140, 150.

When step E320 is implemented before step E310, step E320 is implemented in the same manner, but for one or several device(s) 125, 140, 150 from the group 120 of devices.

Subsequently, it is considered that the first device 140 meets the delegation criterion and that it is determined as being the delegate device ED from the sub-group 121 of devices. The other devices 125, 150 from the sub-group 121 of devices, including the second device 150, are then called client devices.

A step (not represented) of determining a maximum number of client devices that the sub-group 121 of devices may comprise can be implemented based on a service quality criterion of the delegate device ED, 140 for example the criterion of step E320. The main referent server 110 can then adjust the number of client devices from the sub-group 121 of devices, based on this criterion.

In a step E336, the main referent server 110 sends to each client device (for example to the second device 150) a second message M2 comprising an instruction CC to contact the delegate device 140 instead of the main referent server 110 in order to implement one or several maintenance operation(s), for example the maintenance operation associated with the reference parameters PCR selected in sub-step E312, as well as possibly maintenance operations following this maintenance operation. More specifically, the instruction CC is to no longer send the first message M1 to the main referent server 110 but to send a message M9, similar to the first message M1, to the delegate device 140.

By "similar" is meant that the message M9 is of the same type as the first message M1 (connection message), the content of the message being able to be modified based on the context of sending the message, typically based on information relating to the activity of the client device or to the event triggering the connection request.

In a particular embodiment, the delegate device ED, 140 to be contacted is identified by its address in the communication network, for example its IP address.

The second message M2 can further comprise at least one condition of exclusion CE from said sub-group 121 of devices, from among the following list of exclusion conditions CE:
- a maximum duration of allocation of the client device to the sub-group 121 of devices (this duration being typically of one month), which results in a limited duration of assignment of the delegate server as a contact person,
- a maximum number of permitted maintenance operations performed by the client device (for example a software migration),
- a maximum number of failed attempts by the client device to contact the delegate device (for example three attempts),
- a failure of an authentication procedure between the client device and the delegate device,
- a detection of a fraud or a detection of a network vulnerability at the delegate device,
- a modification of a parameter of configuration of the client device,
- a detection of instructions concerning a non-permitted operation,
- a detection of an operation of the client device preventing the client device from contacting the delegate device (for example an operation of return to the factory parameters).

As a variant, one or several of the aforementioned conditions are pre-recorded in the client device 125, 150, typically the exclusion condition in the event of failure of an authentication procedure between the client device and the delegate device 140.

In a step E338, the main referent server 110 sends, to the delegate device 140, a third message M3 comprising an instruction CT to transfer, to at least one client device 125, 150 of the sub-group 121 of devices, at least one command relating to the maintenance operation. The third message M3 can comprise at least one of the aforementioned exclusion conditions CE, one or several condition(s) that can be pre-recorded in the delegate device 140.

More specifically, the instruction CT indicates to the delegate device 140 a procedure to be followed when it receives a message M9 sent by a client device 125, 150 from the sub-group 121 of devices, this procedure being detailed below in steps F356, G356, F358 and G358.

In a step F340, the delegate device 140 sends to the main referent server 110 a fourth message M4, similar to the first message M1. The fourth message M4 is for example sent periodically and/or during a predetermined event, such as the powering of the delegate device 140, and/or the end of an update operation.

The fourth message M4 can comprise the parameter(s) of the first device 140 corresponding to the parameters selected in sub-step E312.

If the message M4 does not contain a parameter corresponding to a selected parameter, the main referent server 120 sends a request to the delegate device to retrieve it.

The main referent server 110 determines, in a step E342 and from the configuration parameter(s) of the message M4, whether the maintenance operation OM must be implemented on the delegate device 140.

In addition, the main referent server 110 can verify, in a step E344, that the value of each configuration parameter of the message M4 indeed corresponds to that of the corresponding parameter of configuration of the client devices 125, 150 from the sub-group 121 of devices.

If the value of a parameter PCL, PCS of a client device 125, 150 does not correspond to the value of the corresponding configuration parameter of the message M4, the main referent server 110 excludes this client device from the sub-group 121 of devices (step E346). More specifically, the main referent server 110 sends to the client device 125, 150 a fifth message comprising an instruction to contact the main referent server 110 instead of the delegate device 140, in order to implement the maintenance operation. This client device 125, 150 therefore does not implement step G356 described below, and thus steps F356, F358, G358, G360, G362 and G364, described below, are not implemented. Sub-steps E314, E316 and E318 can then be implemented again in order to replace the excluded client device.

As a variant, when the value of a parameter PCS of the IS configuration of the client device 125, 150 is modified, this parameter PCS corresponding to a reference parameter, the main referent server 110 excludes this device from the sub-group 121 without proceeding with the implementation of step E344.

In addition, in case of modification of the value of a configuration parameter PCL, PCS of the delegate device 140, the value of this parameter may no longer correspond to the value of the corresponding parameter of each client device 125, 150 The main referent server 110 then dissolves the sub-group 121 of devices (step 348).

More specifically, the main referent server 110 sends to the delegate device 140 a sixth message for dissolving the sub-group 121, comprising for example an instruction to no longer transfer commands relating to the maintenance operation.

The delegate device 140 then sends to each client device 125, 150 from the sub-group 121 a seventh message comprising an instruction to contact the main referent server 110 instead of the delegate device 140, in order to implement the maintenance operation. Steps G356, F356, F358, G358, G360, G362 and G364, described below, are then not implemented.

If the maintenance operation must be implemented, the main referent server 110 sends (step E350) an eighth message M8 comprising a maintenance command CM to the delegate device 140, this command CM containing instructions for the implementation of the maintenance operation. Upon receipt (step F350) of the maintenance command, the delegate device 140 can record the maintenance command (step F352).

The delegate device 140 then follows, in a step F354, the instructions of the maintenance command in order to implement the maintenance operation for itself.

In addition, when the delegate device 140 receives (step F356) a ninth message M9 sent (step G356) by a client device 125, 150 from the sub-group 121 of devices, it transmits to this client device 125, 150, in a step F358, a tenth message M10 comprising the maintenance command CM received in step F350. By transmitting the maintenance command CM, the delegate device 140 implements part of the maintenance operation.

After receipt G358 of the maintenance command, the client device 125, 150 determines, in a step G360, whether it satisfies at least one exclusion condition CE transmitted in step E336 by the main referent server 110 in the second message M2, or pre-recorded in the client device 125, 150.

The delegate device 140 can typically transmit, for example in the message M10, its configuration parameters PCS, PCL corresponding to the reference parameters PCR, so that the client device verifies whether one of its configuration parameters PCS, PCL has been modified.

If the client device 125, 150 does not meet an exclusion condition, the client device 125, 150 follows the instructions of the maintenance command in order to implement the rest of the maintenance operation (step G362).

If the client device 125, 150 meets at least one exclusion condition CE, the client device 125, 150 excludes itself from the sub-group 121 of devices (step G364). The client device 125, 150 then no longer follows the instruction CC to contact the delegate device 140 instead of the main referent server 110 of the second message M2, and contacts the main referent server 110. The sub-steps E314, E316 and E318 can then be implemented again in order to replace the excluded client device 125, 150.

In a particular embodiment, following the receipt of the message M9 coming from a client device 125, 150 from the sub-group 121, the delegate device 140 determines whether this client device satisfies at least one exclusion condition CE transmitted in step E338 by the main referent server 110 in the third message M2, or prerecorded in the delegate device 140. If this client device satisfies at least one exclusion condition CE, the delegate device 140 excludes it from the sub-group 121 of devices.

If the sub-group 121 comprises a number of client devices below a predetermined threshold, the sub-group 121 is dissolved. This condition is for example satisfied by the delegate device 140, or the main referent server 110.

The steps of the method can be repeated to create at least another sub-group 120 of devices, for the same maintenance operation or for another maintenance operation (the parameters selected in sub-step E312 can then be different). Several delegate devices then unload the main referent server 110 for the maintenance operations.

For example, the method can comprise several implementations in parallel with step E320 to determine several delegate devices ED, then, once the delegate devices ED are determined, it can comprise several implementations in parallel with step E310, in order to define a sub-group 121 of devices for each determined delegate device ED.

The invention claimed is:

1. A method of managing a group of devices, the method comprising:
    defining, by a main referring server, a sub-group of devices from the group of devices, the sub-group of devices comprising at least two devices from the group of devices, each of the devices of the sub-group of devices having a same value for at least one common configuration parameter, the configuration parameter corresponding to a local configuration parameter of the device,
    determining, by the main referring server, a delegate device for implementing at least part of a maintenance operation on at least one device from the sub-group of devices, the delegate device being a device from the sub-group of devices, wherein determining the delegate device comprises determining the delegate device based on a delegation criterion associated with the delegate device, the delegation criterion corresponding to a service quality criterion; and
    sending, by the main referring server to the delegate device, a message comprising an instruction to transfer, to at least one device from the sub-group of devices distinct from the delegate device, at least one command relating to the maintenance operation, the instruction directing the delegate device to answer with a message comprising the received command relating to the maintenance operation when said delegate device receives a message from a client device,
    sending, by the main referring server to at least one client device of the sub-group of devices distinct from the delegate device, a message comprising an instruction to contact the delegate device instead of the main referring server in order to implement the maintenance operation, the message further comprising at least one condition of exclusion, said condition of exclusion, if met, leading to an exclusion of the at least one client device from the sub-group of devices, thereby allowing the at least one client device to be autonomous in deciding whether or not to exclude itself from its own sub-group and thereby preventing the delegate device from regularly checking whether or not devices of the sub-group of devices should be excluded or not from said sub-group;
    receiving the message by the at least one client device;
    determining, by the at least one client device, whether the at least one client device satisfies the at least one exclusion condition of the received message, and
    upon a determination that the at least one client device satisfies the at least one condition of exclusion of the received message, excluding, by the at least one client device, the at least one client device from the subgroup of devices.

2. The method of claim 1, further comprising dissolving the sub-group of devices when at least one dissolution condition is satisfied.

3. The method of claim 1, further comprising determining a maximum number of devices that the sub-group of devices can comprise, based on at least one delegation criterion associated with the delegate device, the delegation criterion corresponding to the service quality criterion, thereby allowing the delegate device to preserve a part of the resources so that it can carry out usual tasks.

4. The method of claim 2, wherein the at least one dissolution condition comprises at least one of:
    reaching a minimum number of devices belonging to the sub-group of devices; or
    determining that a configuration parameter corresponding to a hardware version of the device or a software version of the determined delegate device has changed.

5. A computer comprising a processor and a memory, the memory having stored thereon instructions, which when executed by the processor, cause the computer to implement the method of claim 1.

6. A non-transitory, computer-readable storage medium having stored thereon instructions which, when executed by a processor, cause the processor to implement the method of claim 1.

7. A system comprising a main referring server and a group of devices, the main referring server comprising a processor and a memory, the memory having stored thereon instructions which, when implemented by the processor, configure the main referring server to:
- define a sub-group of devices from the group of devices, the sub-group of devices comprising at least two devices from the group of devices, each of the devices of the sub-group of devices having a same value for at least one common configuration parameter, the configuration parameter corresponding to a local configuration parameter of the device, and
- determine a delegate device for implementing at least part of a maintenance operation on at least one device from the sub-group of devices, the delegate device being a device from the sub group of devices, wherein determining the delegate device comprises determining the delegate device based on a delegation criterion associated with the delegate device, the delegation criterion corresponding to a service quality criterion; and
- send, to the delegate device, a message comprising an instruction to transfer, to at least one device from the sub-group of devices distinct from the delegate device, at least one command relating to the maintenance operation, the instruction directing the delegate device to answer with a message comprising the received command relating to the maintenance operation when said delegate device receives a message from a client device;
- send, to at least one client device of the sub-group of devices distinct from the delegate device, a message comprising an instruction to contact the delegate device instead of the main referring server in order to implement the maintenance operation, the message further comprising at least one condition of exclusion, said condition of exclusion, if met, leading to an exclusion of the at least one client device from the sub-group of devices, thereby allowing the at least one client device to be autonomous in deciding whether or not to exclude itself from its own sub-group and thereby preventing the delegate device from regularly checking whether or not devices of the sub group of devices should be excluded or not from said sub-group; and
- the at least one client device comprising a processor and a memory, the memory having stored thereon instructions which, when implemented by the processor, configure the at least one client device to:
- receive the message sent by the referring server;
- determine whether the at least one client device satisfies the at least one exclusion condition of the received message, and if so,
- exclude the at least one client device from the sub-group of devices.

* * * * *